United States Patent [19]

Haraguchi

[11] Patent Number: 4,968,056

[45] Date of Patent: Nov. 6, 1990

[54] WHEEL SUSPENSION OF VEHICLE HAVING COMBINATION OF INVERSE A-TYPE ARM AND I-TYPE ARM

[75] Inventor: Tetsunori Haraguchi, Susono, Japan

[73] Assignee: Toyota Jidosha Kabushiki Kaisha, Aichi, Japan

[21] Appl. No.: 339,167

[22] Filed: Apr. 17, 1989

[30] Foreign Application Priority Data

Apr. 19, 1988 [JP] Japan .................. 63-95998

[51] Int. Cl.$^5$ .............................................. B60G 3/20
[52] U.S. Cl. ................................... 280/690; 280/675
[58] Field of Search ............... 280/675, 673, 690, 691, 280/696, 701, 688

[56] References Cited

U.S. PATENT DOCUMENTS

| | | | |
|---|---|---|---|
| 3,189,118 | 6/1965 | Arning | 280/701 |
| 4,457,537 | 7/1984 | von der Ohe et al. | 280/675 |
| 4,474,389 | 10/1984 | von der Ohe | 280/701 |
| 4,515,391 | 5/1985 | Koide | 280/690 |

FOREIGN PATENT DOCUMENTS

| | | |
|---|---|---|
| 0182606 | 5/1986 | European Pat. Off. ............ 280/688 |
| 2355588 | 5/1975 | Fed. Rep. of Germany . |
| 50-86027 | 11/1975 | Japan . |
| 61-50817 | 3/1986 | Japan . |
| 2202197 | 9/1988 | United Kingdom . |

OTHER PUBLICATIONS

David Scott & Jack Yamaguchi, "International Viewpoints", Automotive Engineering, vol. 91 (1983), Mar., No. 3, Dallas, Tx.

Primary Examiner—Charles A. Marmor
Assistant Examiner—Karin Tyson
Attorney, Agent, or Firm—Oliff & Berridge

[57] ABSTRACT

A wheel suspension of a vehicle such as an automobile having a combination of an inverse A-type arm and an I-type arm for mounting a wheel supporting member such as a spindle or an axle bearing to a vehicle body, wherein the inverse A-type arm is pivotably connected at its apex end with the vehicle body and at its two foot ends with the wheel supporting member at two points thereof spaced generally in a horizontal direction, and the I-type arm is pivotably connected at its one end with the vehicle body at a point spaced from the apex end of the inverse A-type arm generally in a horizontal direction and at its another end with the wheel supporting member at a point close to one foot end of the inverse A-type arm, the connection of the I-type arm to the wheel supporting member, and the close-by point of one foot end of the inverse A-type arm being aligned along a substantially vertical straight line.

4 Claims, 3 Drawing Sheets

WHEEL SUSPENSION OF VEHICLE HAVING COMBINATION OF INVERSE A-TYPE ARM AND I-TYPE ARM

BACKGROUND OF THE INVENTION

1. Field of the Invention

The present invention relates to a wheel suspension of a vehicle such as an automobile, and more particularly, to a wheel suspension for mounting a wheel to a vehicle body with high stability of toe adjustment while allowing bounding and rebounding of the rear wheel relative to the vehicle body.

2. Description of the Prior Art

A problem by nature of the wishbone type wheel suspension is that even a very small relative shifting between the pivot centers of the mutually pivoting members at each pivot point in the suspension due to certain resiliency of a bush element or the like incorporated in the pivot point could induce a relatively large deviation of the toe adjustment of the wheel supported by the suspension. Additional reinforcing members such as a control rod or a tie rod have been incorporated in the wishbone type suspensions. However, the conventional combinations of a wishbone member and a control rod or a tie rod do not appear to be completely satisfactory with regard to the stability of toe adjustment.

In the conventional combinations of a wishbone member and a control rod or a tie rod, a wheel supporting member such a spindle or a wheel axle bearing is primarily supported from the vehicle body by a wishbone member, or a set of upper wishbone member and a lower wishbone member in the double wishbone type suspension, and a control rod or a tie rod is mounted generally in parallel with the wishbone member on the front side or the rear side of the wishbone member or members so as to serve as a horizontal strut member for restricting casual turns of the wheel in toe changing directions. However, since the control rod or the tie rod is pivotably connected at opposite ends thereof with the vehicle body and the wheel supporting member via a bush or the like in order to allow bounding and rebounding movement of the wheel relative to the vehicle body, the combination of the wishbone member and the control rod or the tie rod form a parallelogrammic frame structure with a part of the vehicle body and the wheel supporting member, said parallelogrammic frame structure being flexible at the four corners thereof. Of course the shape of parallelogram is not fixed only by the length of the four sides.

An A-type arm is known in the wishbone type wheel suspension. It is constructed to have a pair of leg portions integrally joined at one end of each leg portion and is generally pivotably connected at two foot ends thereof with the vehicle body and at an apex end thereof with the wheel supporting member. In such a suspension structure, although the A-type arm itself has a triangular and therefore geometrically fixed shape, the rigidity of the triangular structure does not contribute to the toe holding stability of the wheel mounted to the apex point of the triangle. When a control rod or a tie rod is combined with such an A-type arm, it results again in a parallelogrammic structure.

SUMMARY OF THE INVENTION

In consideration of the above-mentioned problem by nature of the wishbone type suspension and the conventional combinations of a wishbone member and a control rod or a tie rod, it is a primary object of the present invention to provide a new wishbone type suspension that is improved in the ability of holding the toe adjustment of the wheel.

It is another object of the present invention to provide such a wishbone type suspension that has high toe holding ability and is also applicable to a wheel to be steered.

The above-mentioned objects of the present invention are accomplished by a wishbone type suspension of a vehicle for mounting a wheel to a vehicle body in a manner of allowing bounding and rebounding of the wheel relative to the vehicle body, comprising: a wheel supporting member for supporting the wheel to be rotable about an axis of rotation, an inverse A-type arm having two leg portions integrally connected at one end of each leg portion thereof to present an apex end and two foot ends apart from one another and pivotably connected at said apex end with the vehicle body at a first point thereof and at said two foot ends with said wheel supporting member at a first and a second point thereof generally horizontally spaced from one another, and an I-type arm pivotably connected at one end thereof with the vehicle body at a second point thereof generally horizontally spaced from said first point thereof and at another end thereof with said wheel supporting member at a third point thereof close to said second point thereof.

According to the above-mentioned construction, the overall position of the wheel, or the wheel supporting member, relative to the vehicle body, or more precisely, the position of said second and third points (which are close to one another and define a king pin axis) of the wheel supporting member at which the wheel supporting member is pivotably supported from the suspension linkage is firmly fixed by the triangular linkage construction formed of the inverse A-type arm (one leg portion thereof is enough), the I-type arm and a portion of the vehicle body extending between said first and second points of the vehicle body, while on the other hand, the angular position of the wheel, or the wheel supporting member, about said second and third points of the wheel supporting member (king pin axis) is firmly fixed by the triangular linkage construction formed of the two mutually integral leg potions of the inverse A-type arm and a portion of the wheel supporting member extending between said first and second points of the wheel supporting member. Therefore, both the position of the king pin axis relative to the vehicle body and the angular position of the wheel about the king pin axis are firmly fixed respectively by a triangular linkage construction. Thus, the toe adjustment of the wheel is stably maintained.

Further, when the suspension is constructed to include such a shifting system that selectively shifts the apex end of the inverse A-type arm pivotably connected with the vehicle body at said first point thereof along a pivot axis passing through said first and second points of the vehicle body, the wheel is stably steered about said king pin axis passing through said second and third points of the wheel supporting member by means of a rigid steering arm provided by the triangular linkage construction formed of the inverse A-type arm and a portion of the wheel supporting member under a stable holding of the king pin position by the triangular linkage construction formed of the inverse A-type arm, the I-type arm and a portion of the vehicle body.

Therefore, according to a particular feature of the present invention, said second and third points of said wheel supporting member are desirably be aligned along a substantially vertical straight line so as to define the king pin axis.

The wishbone type suspension according to the present invention may desirably be incorporated into a double wishbone type suspension which further comprises an A-type arm having two leg portions integrally connected at one ends thereof to present an apex end and two foot ends apart from one another and pivotably connected at said two foot ends thereof with the vehicle body at a third and a fourth point thereof generally horizontally spaced from one another and generally vertically spaced from said first and second points thereof and at said apex end thereof with said wheel supporting member at a fourth point thereof generally vertically spaced from second and third points thereof.

In such a double wishbone type suspension, said second, third and fourth points of said wheel supporting member may desirably be aligned along a substantially vertical straight line so as to define the king pin axis.

Further, such a double wishbone type suspension as described above may desirably be used for a rear suspension which supports an engine driven rear wheel to the vehicle body so as to transmit driving and braking forces therebetween with such modifications that said third and fourth points of the vehicle body are positioned above said first and second points of the vehicle body; said second and fourth points of the vehicle body are positioned on the rear side of said first and third points of the vehicle body, respectively; a pivot axis passing through said first and second points of the vehicle body is inclined relative to the vehicle body so as to ascend in the front and to descend in the rear as seen from a side of the vehicle and so as to depart from a longitudinal center of the vehicle body in the front and to approach a longitudinal center of the vehicle body in the rear as seen from a top of the vehicle; and a pivot axis passing through said third and fourth points of the vehicle body is inclined relative to the vehicle body so as to descend in the front and to ascend in the rear as seen from a side of the vehicle. The merits of such modifications will be described hereinafter in connection with the embodiment.

In the following the present invention will be described with respect to a preferred embodiment with reference to the accompanying drawings.

BRIEF DESCRIPTION OF THE DRAWINGS

In the accompanying drawings.

DESCRIPTION OF THE PREFERRED EMBODIMENT

Figure 1:
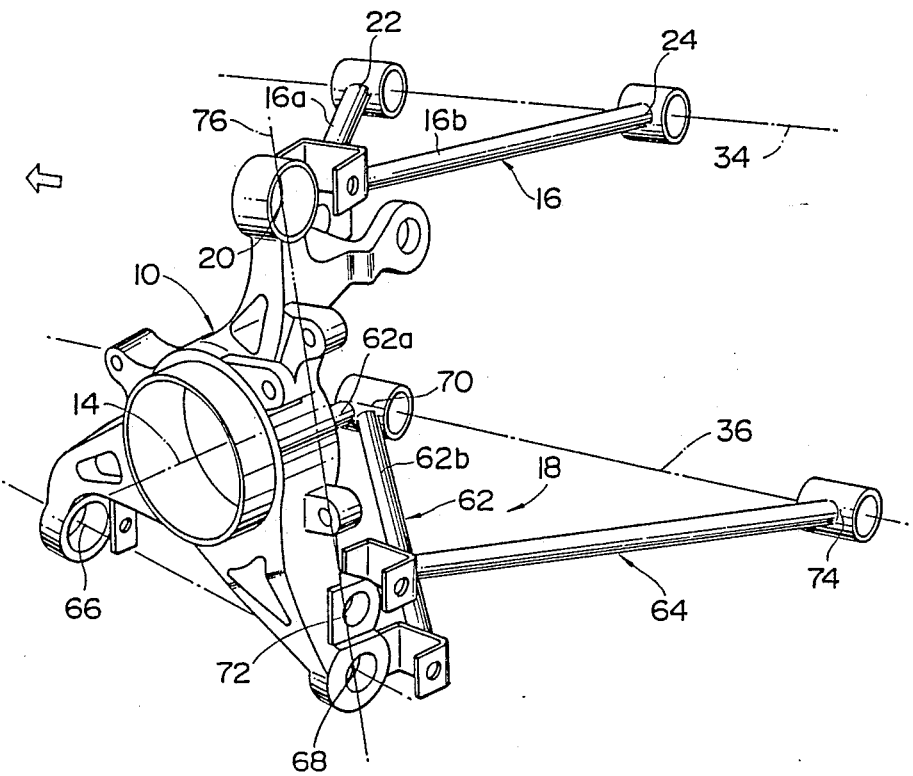
FIG. 1 is a perspective view of an embodiment of the wheel suspension according to the present invention incorporated in a double wishbone suspension.
Figure 2:
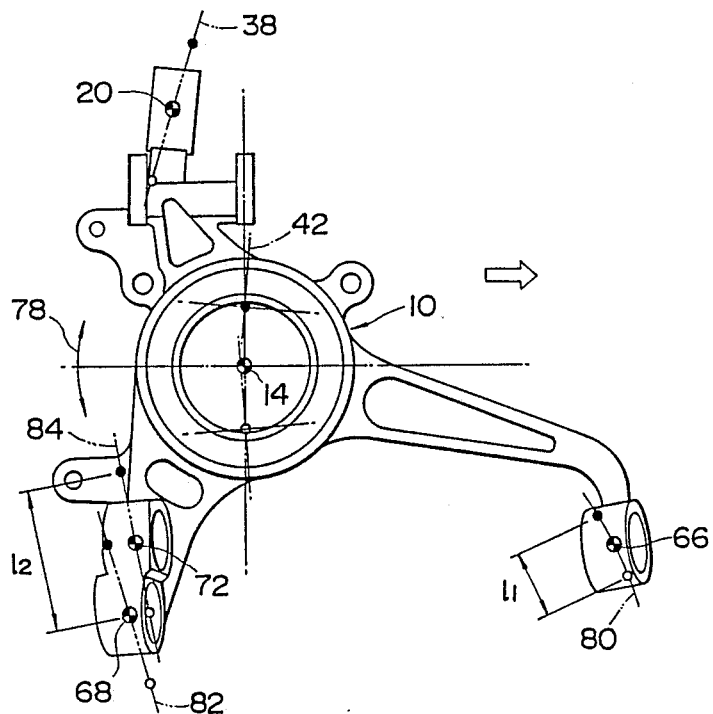
FIG. 2 is a side view seen from the inside toward the outside of the vehicle of the wheel supporting member in the wheel suspension shown in FIG. 1.

In the present specification, expressions such as "front", "rear", "forward", "rearward", "right", "left", "up", "down", "upper", "lower" or the like are all based upon the common sense in respect to the nominal orientation with regard to a vehicle like an automobile placed on a generally horizontal ground. Further, the white arrows in the figures show the forward direction of the vehicle.

Referring to FIGS. 1-4, the wheel suspension of a vehicle according to the present invention is incorporated in a double wishbone type suspension employing an A-type upper arm 16 and a lower arm construction formed as a combination an inverse A-type lower arm 62 and an I-type arm 64. The arm 62 called "inverse A-type arm" is substantially the same in the construction of itself as the arm 16 called "A-type arm", but is called so in the present specification as the orientation of mounting is reversed relative to the arm 16. The arms 16, 62 and 64 in combination support a wheel supporting member 10 having a bearing construction for supporting a axle (not shown) to be rotatable about an axis of rotation 14 of a wheel 12.

The A-type upper arm 16 has two leg portions 16a and 16b and is pivotably connected with the wheel supporting member 10 at its apex end via a ball joint 20 positioned at a point generally higher than the axis of rotation 14 and with a vehicle body 26 (FIG. 3) at its two foot ends via pivot joints 22 and 24 thereby defining a pivot axis 34 generally extending in the longitudinal direction of the vehicle.

In the lower arm construction, the wheel supporting member 10 has two pivot points 66 and 68 generally lower than the axis of rotation 14 for pivot connection with two foot ends of two leg portions 62a and 62b of the inverse A-type arm 62, and a pivot point 72 generally lower than the axis of rotation 14 for pivot connection with an outside end of the I-type arm 64. The apex end of the inverse A-type arm 62 is pivotably connected with the vehicle body 26 at a pivot point 70, whereas the inside end of the I-type arm 64 is pivotably connected with the vehicle body at a pivot point 74 spaced from the pivot point 70 on the rear side of the vehicle, thereby defining a pivot axis 36 for pivoting the lower arm assembly made of the inverse A-type arm 62 and the I-type arm 64. Further, the pivot point 68 between the rear side leg 62b and the wheel suspension member 10 and the pivot point 72 between the I-type arm 64 and the wheel supporting member 10 are arranged to align with one another and further with the pivot point of the ball joint 20 pivotably connecting the apex end of the upper A-type arm 16 with the wheel supporting member 10 to define a substantially vertical pivot axis 76 about which the wheel supporting member 10 can rotate in the steering manner. Therefore, the suspension of this embodiment is applicable to a steerable wheel so that the wheel supporting member 10 is turned about the pivot axis 76 serving as a steering axis like the so-called king pin.

In the above described construction it will be appreciated that the wheel supporting member 10 is supported as a whole from the vehicle body 26 via a triangular linkage construction formed of the A-type arm 16 having the two leg portions 16a and 16b integrally connected with one another and a portion of the vehicle body 26 extending between the two pivot points 22 and 24 at an upper portion thereof and a triangular linkage construction formed of the inverse A-type arm 62 (only the leg portion 62b is enough), the I-type arm 64 and a portion of the vehicle body 26 extending between the two pivot points 70 and 74) at a lower portion thereof so as to be pivotable about the king pin axis 76, while the angular position of the wheel supporting member 10 about the king pin axis 76 is restricted by a triangular linkage construction formed of the inverse A-type arm 62 having the two legs 62a and 62b and a portion of the wheel supporting member 10 extending between the two pivot points 66 and 68.

In these figures the spring and the damper unit to be incorporated in the suspension according to the conventional structure are omitted for the clarity of the illustration, because any particular structure of such a unit would not substantially affect the construction of the present invention.

Figure 4:
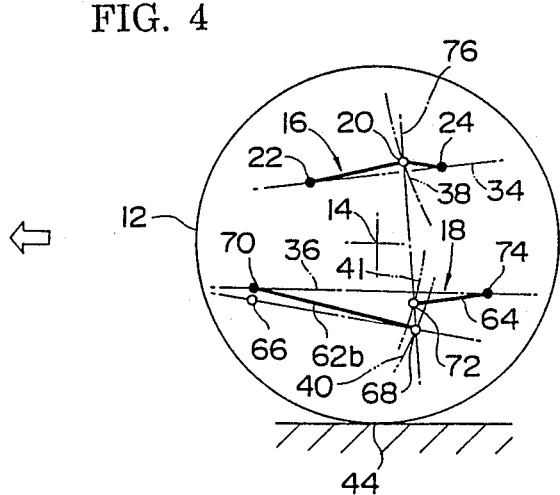
FIG. 4 is a side view in schematic illustration of the wheel suspension shown in FIG. 1.

In FIG. 4, which is a side view of the suspension and therefore corresponds to a side view of the vehicle, a phantom line 38 is a trace of movement of the pivot point 20 according to up and down swinging of the upper arm 16 due to bounding and rebounding of the wheel, and phantom lines 40 and 41 are traces of movement of the pivot points 68 and 72, respectively, according to up and down swinging of the lower arm construction made of the inverse A-type arm 62 and the I-type arm 64 due to bounding and rebounding of the wheel. The inclination of the trace of movement 38 on opposite sides of a standard point corresponding to no bounding and no rebounding of the wheel is generated by the inclination of the pivot axis 34 relative to the vehicle body to descend in the front and to ascend in the rear as seen in a side view of the vehicle as in FIG. 4. Similarly, the inclination of the traces of movement 40 and 41 on opposite sides of each standard point thereof corresponding to no bounding and no rebounding of the wheel is generated by the inclination of the pivot axis 36 relative to the vehicle body to ascend in the front and to descend in the rear as seen in a side view of the vehicle as in FIG. 4.

Figure 3:
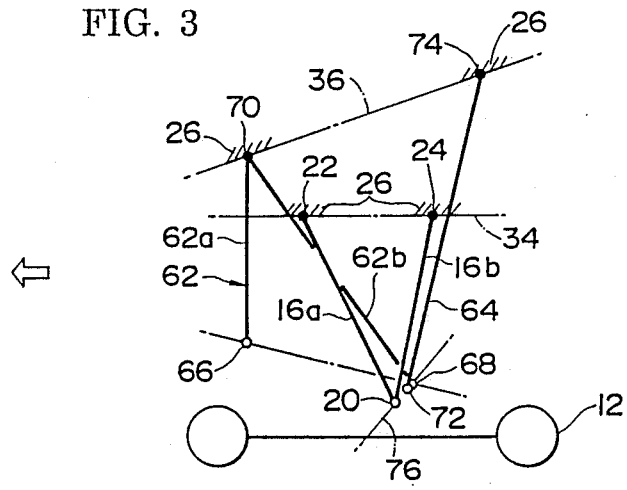
FIG. 3 is a plan view in schematic illustration of the wheel suspension shown in FIG. 1.

The curvature of the trace of movement 38 convex toward the front is generated by the inclination of the pivot axis 34 relative to the vehicle body as viewed from a top of the vehicle as shown in FIG. 3 so as to approach the longitudinal center of the vehicle in the front and to depart from the longitudinal center of the vehicle in the rear. Similarly, the curvature of the traces of movement 40 and 41 concave toward the front is generated by the inclination of the pivot axis 36 relative to the vehicle body as viewed from a top of the vehicle as shown in FIG. 3 so as to depart from the longitudinal center of the vehicle in the front and to approach the longitudinal center of the vehicle in the rear.

By the combination of the traces of movement 38, 40 and 41 delimiting the movement of the upper and the lower portion of the wheel supporting member 10, when the arms 16, 62 and 64 swing up and down according to the bounding and rebounding of the wheel relative to the vehicle body, the axis of rotation 14 of the wheel moves along an approximately vertical line which may desirably be slightly convex toward the front resulted from the balance between a generally forward movement of the upper end portion of the wheel supporting member 10 and a generally rearward movement of the lower end portion of the wheel supporting member 10 along with the bounding of the wheel, and the balance between a generally rearward movement of the upper end portion of the wheel supporting member 10 and a generally forward movement of the lower end portion of the wheel supporting member 10 along with the rebounding of the wheel, whereas since the wheel supporting member 10 is turned anticlockwise along with the bounding and clockwise along with the rebounding of the wheel as viewed in FIG. 4, a momentary ground contact point 44 which is a point on the wheel at which the wheel contacts with the ground at each moment draws a curved trace of movement which is concave toward forward and upward also as viewed in FIG. 4.

Since the driving force transmitted from the wheel to the vehicle body acts along a line of force passing through the axis of rotation 14 and a point of intersection of a normal line drawn in FIG. 4 to the trace of movement of the axis of rotation 14 with a normal line drawn in FIG. 4 to the trace of movement 40 or 41, the line of force in driving remains generally horizontal regardless of the bounding and rebounding of the wheel. Therefore, an advantage is obtained by this suspension that the bounding and rebounding of the wheel do not induce any reciprocating acceleration in the vehicle body in the longitudinal direction thereof. Such a longitudinally reciprocating acceleration, if induced in the vehicle body, is highly unpleasant to the driver and passengers. Moreover, when this suspension is used for the rear wheel, such a further advantage is available, if the trace of movement of the axis of rotation 14 is convex toward the front as seen in FIG. 4, that the driving force transmitted from the rear wheel to the vehicle body has an effect of suppressing the rolling of the vehicle body when the vehicle is turning around a corner or along a curved road.

On the other hand, the braking force transmitted between the wheel and the vehicle body acts along a line of force passing through the above-mentioned point of intersection and the above-mentioned momentary ground contact point. Therefore, when the trace of movement 40 or 41 of the pivot point 68 or 72 in FIG. 4 is appropriately curved to be concave toward forward and upward while the trace of movement of the axis of rotation 14 is substantially vertical in FIG. 4, the above-mentioned point of intersection can be positioned far forward of a pivot point of the arm member of the conventional trailing arm type suspension and moves from a standard position thereof corresponding to no bounding and no rebounding of the wheel forward and upward along with the bounding of the wheel and rearward and downward along with the rebounding of the wheel. Based upon this, the angle expanded by the line of force of the braking force transmitted between the wheel and the vehicle body relative to the ground can be made smaller than the angle expanded by the arm member of the conventional trailing arm type suspension relative to the ground, and the change of such angle along with the bounding and rebounding of the wheel is also made smaller than in the conventional trailing arm type suspension. Therefore, when the wheel suspension as shown in FIGS. 1-4 is used for a rear wheel suspension, the action of the braking force on the suppression of the rolling of the vehicle body in turning of the vehicle can be optimized from the view point of avoiding over-suppression of the rolling that will increase the probability of vehicle spinning.

The above-mentioned performance of the suspension with regard to the effects of driving and braking forces on the vehicle body is a subject of co-pending patent application No. 07/339,120 filed by the same applicant. Therefore, if any more detail in this regard is required, reference is to be made to said co-pending application.

However, it will be noted from the above outline of the performance available by the suspension shown in FIGS. 1-4 that, in the lower arm construction formed of the inverse A-type arm 62 and the I-type arm 64, the pivot axis 36 may desirably be inclined as seen in FIG. 3 so that it departs from the longitudinal center of the vehicle body in the front and to approach the longitudinal center in the rear so as to generate the arcuate trace of movement 40 and 41 of the pivot points 68 and 72 along with the bounding and rebounding of the wheel. When the pivot axis 36 is inclined in the above-mentioned manner, the length of the inverse A-type arm is made relatively shorter, and thereby the inverse A-type arm is made smaller so that it can be constructed to be light-weighted but to have high rigidity for stably maintaining the toe adjustment of the wheel against outer forces applied to the wheel.

Although the present invention has been described in detail with respect to a preferred embodiment thereof with reference to the accompanying drawings, it will be noted by those skilled in the art that various modifications with regard to the shown embodiment are possible without departing from the spirit of the present invention.

I claim:

1. A wishbone type suspension of a vehicle for mounting a wheel to a vehicle body in a manner of allowing bounding and rebounding of the wheel relative to the vehicle body, comprising: a wheel supporting member for supporting the wheel to be rotatable about an axis of rotation, an inverse A-type arm having two leg portions integrally connected at one end of each said leg portion to present an apex end and two foot ends apart from one another and pivotally connected at said apex end with the vehicle body at a first vehicle body point and at said two foot ends with said wheel supporting member at a first and a second member point generally horizontally spaced from one another, and an I-type arm pivotally connected at one end thereof with the vehicle body at a second vehicle body point generally horizontally spaced from said first vehicle body point, said I-type vehicle body arm pivotally connected at another end with said wheel supporting member at a connected third member point close to said second member point wherein said second and third member points of said wheel supporting member are aligned along a substantially vertical straight line.

2. A wishbone type suspension according to claim 1, further comprising an A-type arm having two leg portions integrally connected at one end of each said leg portion to present an apex end and two foot ends apart from one another, said A-type arm pivotally connected at said two foot ends thereof with the vehicle body at a third and a fourth vehicle body point generally horizontally spaced from one another and generally vertically spaced from said first and second vehicle body points and at said apex end with said wheel supporting member at a fourth member point generally vertically spaced from said second and third member points.

3. A wishbone type suspension according to claim 2, wherein said fourth member point of said wheel supporting member is aligned along said substantially vertical straight line.

4. A wishbone type suspension according to claim 3, wherein the wheel mounted thereby to the vehicle body is a rear wheel; said third and fourth vehicle body points are positioned above said first and second vehicle body points; said second and fourth vehicle body points are positioned on the rear side of said first and third vehicle body points respectively; a pivot axis passing through said first and second vehicle body points is inclined relative to the vehicle body so as to ascend in the front and to descend in the rear as seen from a side of the vehicle and so as to depart from a longitudinal center of the vehicle body in the front and to approach a longitudinal center of the vehicle body in the rear as seen from a top of the vehicle; and a pivot axis passing through said third and fourth vehicle body points is inclined relative to the vehicle body so as to descend in the front and to ascend in the rear as seen from a side of the vehicle.

* * * * *